United States Patent [19]

Yoshihara

[11] Patent Number: 5,564,479
[45] Date of Patent: Oct. 15, 1996

[54] PROCESS AND APPARATUS FOR PRODUCING LIQUID CRYSTAL PANEL

[75] Inventor: Satoshi Yoshihara, Kawasaki, Japan

[73] Assignee: Canon Kabushiki Kaisha, Tokyo, Japan

[21] Appl. No.: 303,002

[22] Filed: Sep. 8, 1994

Related U.S. Application Data

[62] Division of Ser. No. 72,410, Jun. 7, 1993, abandoned, which is a division of Ser. No. 701,998, May 17, 1991, Pat. No. 5,269,351.

[30] Foreign Application Priority Data

May 23, 1990 [JP] Japan ..................... 2-131271

[51] Int. Cl.$^6$ .................................................. B65B 31/00
[52] U.S. Cl. .................. 141/65; 141/7; 141/48; 141/82
[58] Field of Search ................... 141/1, 4, 5, 7, 141/48, 82, 65; 264/102; 156/145

[56] References Cited

U.S. PATENT DOCUMENTS

| 4,099,550 | 7/1978 | Matsuzaki et al. | 141/7 |
|---|---|---|---|
| 4,753,267 | 6/1988 | Inaba et al. | 141/7 |
| 4,922,972 | 5/1990 | Watanabe et al. | 141/4 |
| 5,029,623 | 6/1991 | Brosig | 141/7 |
| 5,137,484 | 8/1992 | Bohannon | 141/7 |
| 5,141,036 | 8/1992 | Watanabe et al. | 141/7 |
| 5,269,351 | 12/1993 | Yoshihara | 141/7 |

FOREIGN PATENT DOCUMENTS

| 0187425 | 7/1986 | European Pat. Off. . |
| 0049889 | 5/1985 | Japan . |
| 30219 | 2/1987 | Japan . |

OTHER PUBLICATIONS

Patent Abstracts of Japan, vol. 8, No. 48 (P–258) (1485) JP 58-198023.
Patent Abstracts of Japan, vol. 7, No. 127 (P–210) (1272) JP 58-046321.
Patent Abstracts of Japan, vol. 14, No. 274 (P–1061) (4217) JP 2-081022.

Primary Examiner—Henry J. Recla
Assistant Examiner—Steven O. Douglas
Attorney, Agent, or Firm—Fitzpatrick, Cella, Harper & Scinto

[57] ABSTRACT

A liquid crystal contained in a liquid crystal reservoir is applied to an injection port of a blank liquid crystal panel in a vacuum chamber, and the vacuum chamber is restored to the atmospheric pressure to inject the applied liquid crystal into the liquid crystal panel through the injection port. Herein, the liquid crystal, particularly a ferroelectric liquid crystal having a high viscosity, is effectively used for filling the liquid crystal panel with a minimum loss by using a transfer member moving between the liquid crystal reservoir and the liquid crystal panel.

12 Claims, 3 Drawing Sheets

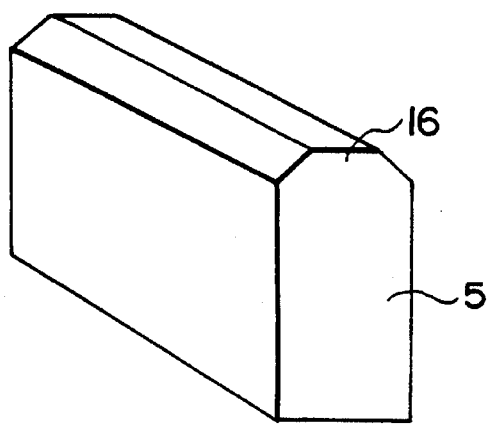
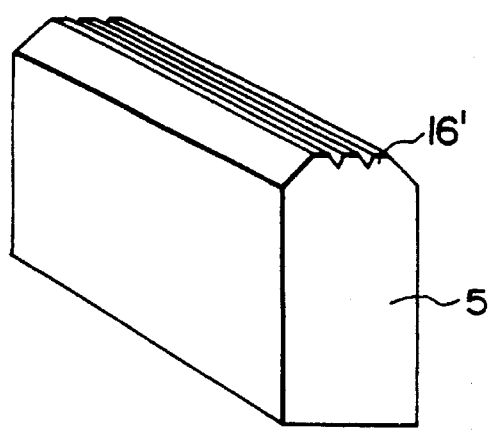
F I G. 3A    F I G. 3B
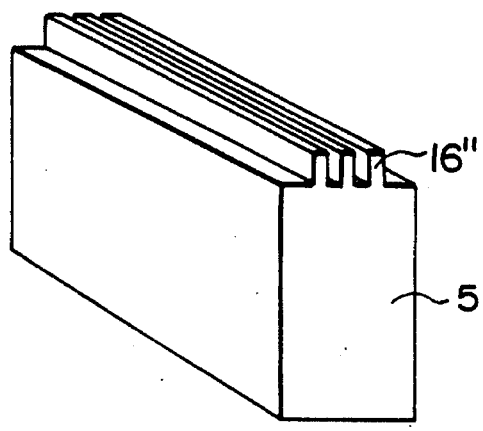
F I G. 3C
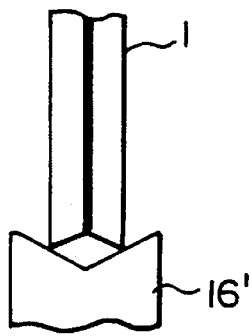
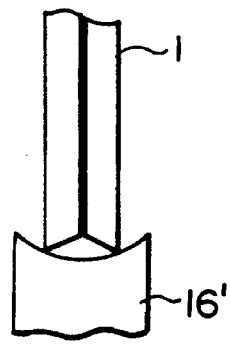
F I G. 4A    F I G. 4B

PROCESS AND APPARATUS FOR PRODUCING LIQUID CRYSTAL PANEL

This application is a division, of application Ser. No. 08/072,410, filed Jun. 7, 1993, now abandoned, which is a division of application Ser. No. 07/701,998, filed May 17, 1991, now U.S. Pat. No. 5,269,351, issued Dec. 14, 1993.

FIELD OF THE INVENTION AND RELATED ART

The present invention relates to a process and an apparatus for producing a liquid crystal panel, particularly a process and an apparatus for producing a liquid crystal panel by injecting a ferroelectric liquid crystal into a liquid crystal cell.

In a conventional process for filling a liquid crystal panel with a liquid crystal known heretofore as disclosed, e.g., by Japanese Patent Publication (JP-B) Sho. 60-49889, a liquid crystal panel and a liquid crystal reservoir are placed in a pressure-resistant container or chamber, the pressure in the container is reduced, the injection port of the liquid crystal panel is dipped in the liquid crystal reservoir, and then the pressure in the container is restored to the atmospheric pressure to fill the liquid crystal panel with the liquid crystal.

However, in case where the above method of liquid crystal injection is used for filling with a ferroelectric liquid crystal material having a higher viscosity than a twisted nematic liquid crystal material, a large amount of the liquid crystal as large as ten times the amount filled in the liquid crystal panel is attached to a portion around the injection port of the liquid crystal panel. Accordingly, a large amount of the liquid crystal is lost and a larger load is required for a troublesome washing step so as to remove the excessive liquid crystal attached to around the injection port.

SUMMARY OF THE INVENTION

An object of the present invention is to provide a process and an apparatus which are optimum for producing a liquid crystal panel by injection of a ferroelectric liquid crystal panel through an improvement of such a conventional method of injecting a liquid crystal material into a liquid crystal panel to reduce the loss of liquid crystal material and the load of the washing as a post-step.

According to an aspect of the present invention, there is provided a process for producing a liquid crystal panel comprising the steps of:

placing a blank liquid crystal panel having an injection port and a liquid crystal reservoir containing a liquid crystal within a vacuum environment, causing a transfer member moving between the liquid crystal reservoir and the liquid crystal panel to carry a portion of the liquid crystal in the liquid crystal reservoir, applying the liquid crystal carried on the transfer member to the injection port of the liquid crystal panel, and placing the injection port of the liquid crystal panel within an environment of atmospheric pressure.

According to another aspect of the present invention, there is provided a process for producing a liquid crystal panel comprising: applying a liquid crystal contained in a liquid crystal reservoir to an injection port of a blank liquid crystal panel in a vacuum space and then restoring the pressure of the vacuum space to an atmospheric pressure to inject the liquid crystal into the liquid crystal panel; wherein a transfer member moving between the liquid crystal reservoir and the liquid crystal panel is used to carry the liquid crystal within the liquid crystal reservoir and then apply the liquid crystal to the injection port of the liquid crystal panel.

According to a further aspect of the present invention, there is provided an apparatus for producing a liquid crystal panel, comprising: a vacuum chamber, and a liquid crystal panel having an injection port and a liquid crystal reservoir containing a liquid crystal disposed within the vacuum chamber so that a portion of the liquid crystal contained in the liquid crystal reservoir is applied to the injection port of the liquid crystal port and then the vacuum chamber is restored to atmospheric pressure, wherein the apparatus further comprises a transfer member moving between the liquid crystal reservoir and the liquid crystal panel to carry the portion of the liquid crystal within the liquid crystal reservoir and then apply the portion to the injection port of the liquid crystal panel.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A–3C are perspective views each illustrating the shape of a part for transferring a liquid crystal of a transfer member.

FIGS. 4A and 4B are partial enlarged views each showing a part for applying a liquid crystal of a transfer member.

DESCRIPTION OF THE PREFERRED EMBODIMENTS

Figure 1:
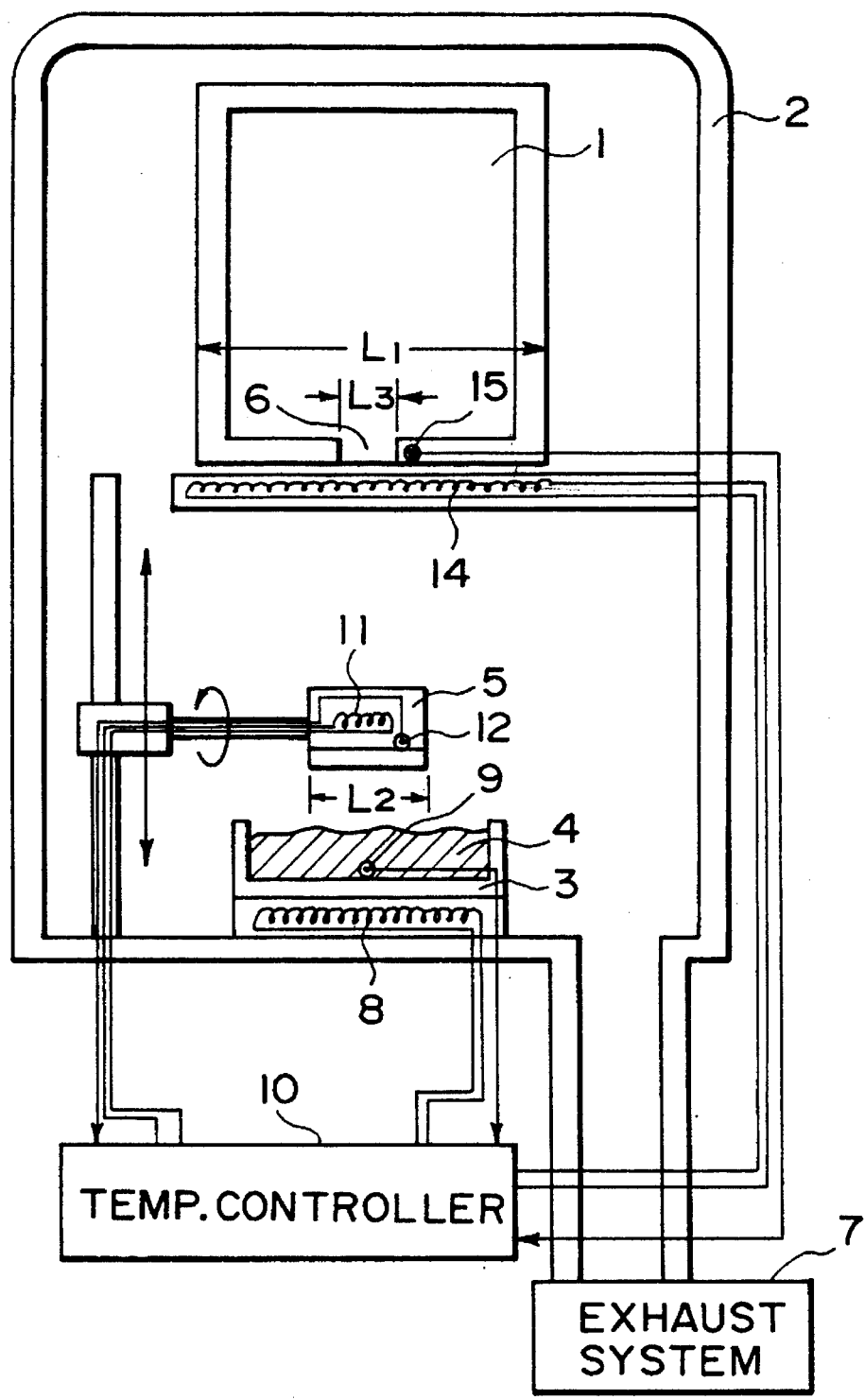
FIG. 1 is a schematic view for illustrating a first embodiment of the process and apparatus for producing a liquid crystal panel according to the present invention.

In a preferred embodiment of the present invention, a transfer member having a transfer part (end) with a length which is longer than the length of an injection port of a liquid crystal panel and shorter than the face of the liquid crystal panel having the injection port is used. Within a vacuum chamber, the transfer part of the transfer member is dipped in a liquid crystal reservoir, is pulled up from the liquid crystal reservoir to apply the liquid crystal within the liquid crystal reservoir onto the transfer member and is then brought in close proximity to or in contact with the injection port of the liquid crystal panel so as to transfer the liquid crystal to the injection port. As a result, the injection port of the liquid crystal panel can be completely covered by the liquid crystal with minimum attachment of the liquid crystal to an unnecessary part of the liquid crystal panel. Then, the vacuum chamber is restored to the atmospheric pressure to inject the liquid crystal into the liquid crystal panel.

If the temperatures of the respective members are controlled, the above-mentioned transfer step can be further stabilized. More specifically, it is preferred to heat the transfer member, the injection port of the liquid crystal panel and the liquid crystal reservoir, so as to provide a temperature $T_1$ for the liquid crystal in the liquid crystal reservoir, a temperature $T_2$ for the transfer member and a temperature $T_3$ for the injection port of the liquid crystal panel, satisfying the relationship of:

$T_1 \geq T_3 \geq T_2$.

The above temperature relationship is desirable for the following reasons.

A ferroelectric liquid crystal generally has a high viscosity, so that it is desirable to utilize a temperature difference between two members in transferring or applying the liquid crystal to control the movement of the liquid crystal.

Firstly, a step of transferring a liquid crystal in a liquid crystal reservoir to a transfer member is explained. A liquid crystal material is generally a mixture comprising many mesomorphic compounds, so that it is necessary to prevent a change or localization in composition within the liquid crystal reservoir. For this reason, it is desirable to heat the liquid crystal reservoir to an elevated temperature to lower the viscosity of the liquid crystal in the reservoir.

In case of transferring the liquid crystal to the transfer member, it is possible to transfer the liquid crystal in a necessary minimum amount if the relationship of $T_1 \geq T_2$ is satisfied between the temperature $T_1$ of the liquid crystal reservoir and the temperature $T_2$ of the transfer member. If a condition of $T_1 < T_2$ stands reversely, an excessive amount of liquid crystal is transferred to the transfer member, so that it becomes necessary to effect a cleaning of the transfer member or the liquid crystal is liable to drop during the movement of the transfer member.

Next, a step of applying the liquid crystal to the liquid crystal panel from the transfer member is explained.

It is desired that as large a proportion as possible of the liquid crystal transferred to the transfer member is applied to the liquid crystal panel. This is because, if a large amount of the liquid crystal remains attached to the transfer member, a cleaning operation can be required for removing the liquid crystal prior to a subsequent transfer cycle. Further, unless the injection port of the liquid crystal panel is completely covered with the liquid crystal, the injection of the liquid crystal fails. For the above reason, it is desired that a relationship of $T_3 \geq T_2$ is satisfied between $T_2$ and the temperature $T_3$ of the injection port of the liquid crystal panel.

Under a higher injection temperature, i.e., a higher $T_3$, it is possible to prevent the invasion of air bubbles at a higher degree because of a lower viscosity, so that a higher $T_3$ is generally preferred. Too high $T_3$ however leads to a problem of dropping of the liquid crystal from the liquid crystal panel. Therefore, it is desired that the upper limit of $T_3$ is set to $T_1$ to satisfy the relation of $T_1 \geq T_3$.

Consequently, it is desirable to set $T_1$, $T_2$ and $T_3$ so as to satisfy the relationship of $T_1 \geq T_3 \geq T_2$.

In the case where the present invention is applied to a ferroelectric liquid crystal material, it is desired to control the temperatures $T_1$, $T_2$ and $T_3$ corresponding to the phase transition temperatures of the ferroelectric liquid crystal. The ferroelectric liquid crystal can be selected from a large scope without particular restriction. For example, (1) if a ferroelectric liquid crystal has a phase transition series of CrystalSmC*SmACh.Iso. (SmC*: chiral smectic phase, SmA: smectic A phase, Ch.: cholesteric phase, Iso.: isotropic phase), or a series of CrystalSmC*Ch.Iso., it is preferred to effect a temperature control so as to satisfy a relationship of $T_1 \geq T_3 \geq$ (cholesteric phase temperature) $\geq T_2$, and (2) if a ferroelectric liquid crystal has a phase transition series of CrystalSmC*SmAIso. or CrystalSm3SmC*Iso. (Sm3: a smectic phase (un-identified)), it is preferred to effect a temperature control so as to satisfy a relationship of $T_1 \geq T_3 \geq$ (isotropic phase temperature) $\geq T_2$. Consequently, it is preferred to effect a temperature control so as to satisfy a relationship of $T_1 \geq T_2 \geq$ (a temperature providing a $T_4$ higher temperature phase than SmC*) $\geq T_3$. This is because a ferroelectric liquid crystal does not generally show a substantial fluidity and is not suitable for transfer and application in SmC* phase or in a lower temperature phase than SmC*. Such a temperature control can be effected by a heater, a thermistor and/or a temperature controller.

The transfer member may preferably have an end face having a length $L_2$ for applying a liquid crystal to the injection port of the liquid crystal panel satisfying the relationship of $L_3 \leq L_2 \leq L_1$ with respect to the liquid crystal panel which has a face including the injection port and having a length $L_1$ and has the injection port having a length $L_3$. This is because, in case of $L_1 < L_2$, the liquid crystal attached to one or both sides is not applied to the liquid crystal panel but remains on the transfer member, thus resulting in difficulties such that it drips or requires a cleaning step and an unnecessary amount of liquid crystal is attached to a side face of the liquid crystal panel. On the other hand, in case of $L_2 < L_3$, the injection port of the liquid crystal panel is not sufficiently covered with the applied liquid crystal, thus allowing air bubbles to enter the liquid crystal panel.

FIGS. 3A–3C respectively show some shapes of a part 16 (FIG. 3A) part 16' (FIG. 3B) or part 16" (FIG. 3C) carrying and applying a liquid crystal of the transfer member 5 and particularly embodiments of the parts 16' and 16" (FIGS. 3B and 3C, respectively) for simultaneously transferring the liquid crystal to a plurality of liquid crystal-panels held in a cassette.

FIGS. 4A and 4B are partially enlarged illustrations of two type of concavities formed at the top of a part 16' for transferring a liquid crystal corresponding to FIG. 3B. The end face of a liquid crystal panel having an injection port is formed by bonding a pair of glass or plastic substrates after alignment at their ends which have been optionally formed by cutting. Particularly, in the case where the end face is formed by cut ends, for example, an injection port is positioned inward from utmost ends of the substrates, and it is preferred that the part 16' carrying and applying the liquid crystal of the transfer member is concave as shown in FIGS. 4A and 4B. Such a concavity has a function of automatically aligning the end face of the liquid crystal panel at the time of applying the liquid crystal to the liquid crystal panel. The concavity also has a function of effectively retaining the liquid crystal to prevent the liquid crystal from dripping.

The shapes of the transfer member and the end face thereof for transferring the liquid crystal are not restricted to those specifically shown in the drawings.

The pressure within the vacuum chamber after evacuation and for the liquid crystal transfer operation may desirably be $1.0 \times 10^{-3}$ torr or below, preferably $1.0 \times 10^{-5}$ torr or below.

As described above, according to the present invention, the injection of a liquid crystal into a liquid crystal panel is effectively carried out with minimum loss of the liquid crystal and alleviation of the load of washing of the liquid crystal as a post-treatment, and also the injection of a ferroelectric liquid crystal having a high viscosity can also be effected easily.

Hereinbelow, the present invention will be explained with specific examples.

EXAMPLE 1

FIG. 1 is a schematic view of an embodiment of the apparatus for producing a liquid crystal panel according to the present invention.

Referring to FIG. 1, the apparatus includes, within a vacuum chamber 2, a liquid crystal panel 1 having at least one injection port 6, a liquid crystal reservoir 3 containing a liquid crystal 4, and a transfer member 5 which is moved between the liquid crystal reservoir 3 and the liquid crystal panel 1 for carrying a portion of the liquid crystal 4 in the liquid crystal reservoir 3 and applying the carried portion of the liquid crystal to the injection port 6 of the liquid crystal panel. In this instance, the liquid crystal panel 1 is formed to have an end face having a length $L_1$ and including the injection port 6 having a length $L_3$, and the transfer member 5 is constituted to include an end face having a length $L_2$ for applying the liquid crystal to the injection port of the liquid crystal panel, satisfying the relationship of $L_3 \leq L_2 \leq L_1$.

In a specific example, these lengths were set to $L_1=275$ mm, $L_2=100$ mm, and $L_3=60$ mm. The liquid crystal 4 was a ferroelectric liquid crystal ("CS-1014", available from Chisso K. K.) showing the following phase transition series:

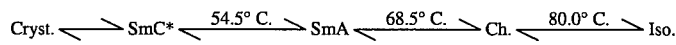

The temperature $T_1$ of the liquid crystal 4 in the liquid crystal reservoir 3, the temperature $T_2$ of the transfer member 5 and the temperature $T_3$ at the injection port of the liquid crystal panel 1 were set to $T_1=90°$ C., $T_2=25°$ C., and $T_3=75°$ C. The transfer member 5 was formed to have liquid crystal application parts 16' shown in FIG. 3C and having a concavity as shown in FIG. 4B.

In preparation of a liquid crystal panel by using the above-mentioned apparatus, an exhaust system 7 conductively connected to a vacuum chamber 2 is first operated to evacuate the vacuum chamber 2 and the inside of the liquid crystal panel 1 contained therein. During the exhaustion step, the liquid crystal 4 in the liquid crystal reservoir 3 is heated by a heater 8 for the liquid crystal reservoir to a temperature ($T_1=90°$ C.) for providing an isotropic phase, the end face having the injection port 6 of the liquid crystal panel 1 is heated by a heater 14 for the liquid crystal panel to a temperature ($T_3=75°$ C.) providing the cholesteric phase of the liquid crystal, and the transfer member 5 is heated to a temperature ($T_2=25°$ C.) by a heater 11 for the transfer member. After a sufficient degree of evacuation to a pressure (e.g., $3 \times 10^{-5}$ torr) within the vacuum chamber 2, the transfer member 5 is partly dipped in and then pulled out of the liquid crystal reservoir 3 to carry a portion of the liquid crystal 4. Then, the transfer member 5 is turned up side-down so as to direct the dipped end upward and then further moved upward to contact the injection port 6 of the liquid crystal panel 1, so that the injection port 6 is completely covered by the carried and transferred portion of the liquid crystal 4. Then, the vacuum chamber 2 is restored to the atmospheric pressure to effectively inject the liquid crystal inside the liquid crystal panel 1.

In this way, in a specific example, the attachment of the liquid crystal to an unnecessary part other than the injection port 6 was minimized.

The heat generation from the heater 8 for the liquid crystal reservoir, the heater 11 for the transfer member and the heater 14 for the liquid crystal panel was controlled by annexed thermistors 9, 12 and 15, respectively, and a temperature controller 10.

EXAMPLE 2

Figure 2:
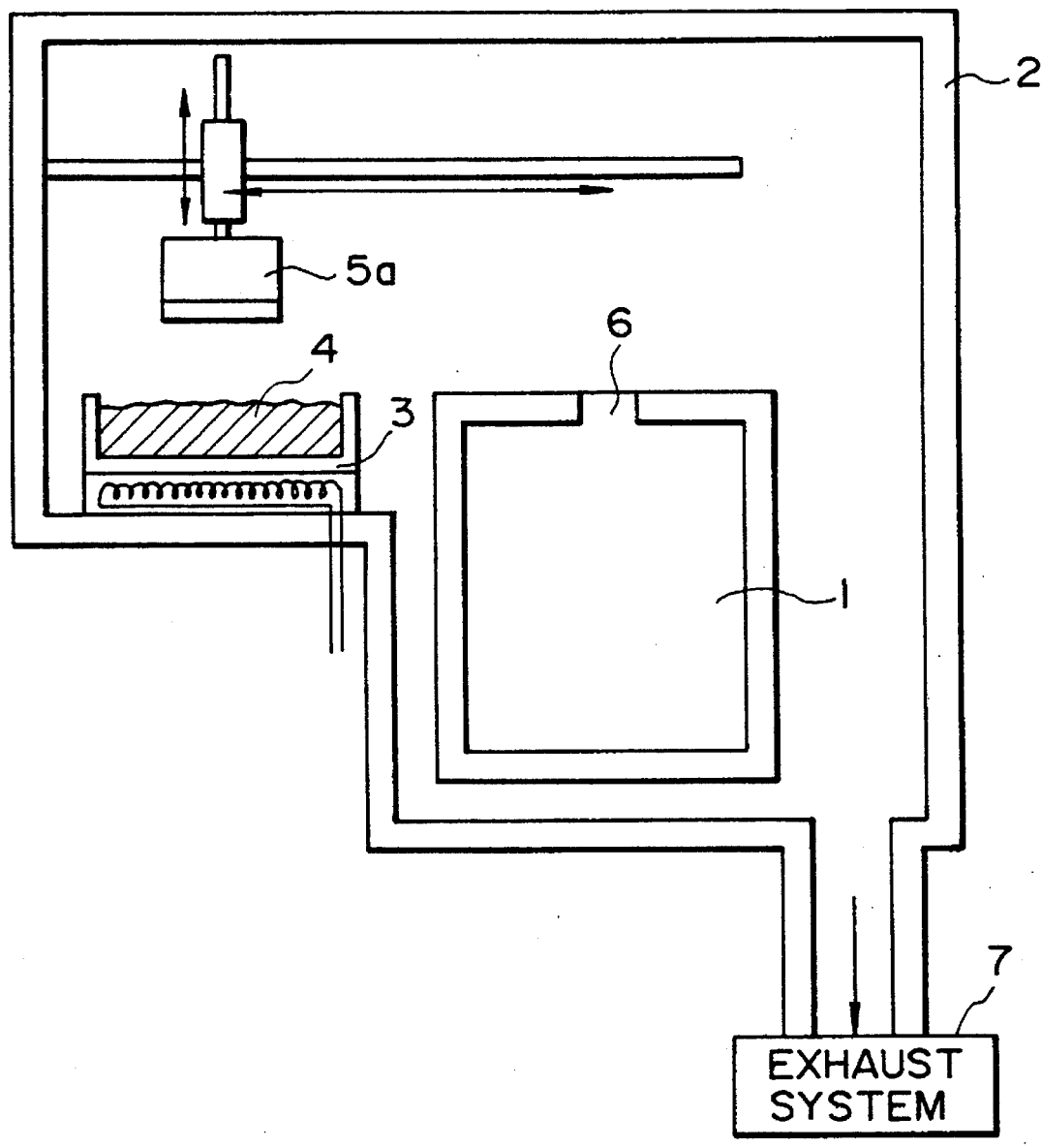
FIG. 2 is a schematic view for illustrating a second embodiment of the process and apparatus for producing a liquid crystal panel according to the present invention.

FIG. 2 is a schematic view of another embodiment of the apparatus for producing a liquid crystal panel according to the present invention. In FIG. 2, like parts are denoted by like references numerals as used in FIG. 1.

More specifically, FIG. 2 shows an embodiment of the apparatus wherein a transfer member 5a after dipping for carrying a portion of a liquid crystal 4 within the liquid crystal reservoir 3 is moved to the injection port 6 of the liquid crystal panel 1 for transfer of the liquid crystal without turning or rotation thereof.

In this example, as the transfer member 5 is not turned or rotated after dipping, the relative positions or directions of the liquid crystal reservoir, and the liquid crystal panel are different from those in Example 1. However, other structures or members and operation thereof are similar to those in Example 1. In FIG. 2, the heaters, thermistors and temperature controller are omitted from showing.

In a specific example according to this example, the liquid crystal panel was also effectively filled with the liquid crystal.

Comparative Example 1

Liquid crystal panels were prepared similarly as in Example 1 except that $L_1$, $L_2$ and $L_3$ were set to $L_3 < L_1 < L_2$.

Because of the relation of $L_1 < L_2$, a portion of the liquid crystal carried on the transfer member and not transferred to a liquid crystal panel remained at both ends of the transfer member. As a result, after several times of the repetitive transfer operation, the liquid crystal was caused to drip, so that a cleaning of the transfer member and inner parts of the vacuum chamber was necessary. Further, as a part of the liquid crystal was attached to side faces of liquid crystal panels, it was also necessary to clean the liquid crystal panels.

Comparative Example 2

Liquid crystal panels were prepared in the same manner as in Example 2 except that the temperatures were set to $T_2=40°$ C. and $T_3=30°$ C. ($T_2 > T_3$ unlike $T_2 < T_3$ in Example 2).

As the temperature $T_2$ of the transfer member was higher than the temperature $T_3$ at the injection port of the liquid crystal panel, about a half of the liquid crystal carried by the transfer member remained thereon without being applied to the injection port of the liquid crystal panel. Because of a little shortage of the liquid crystal applied to the injection port, air bubbles were introduced into the liquid crystal panels at the time of restoration of the atmospheric pressure within the vacuum chamber, so that some liquid crystal panels were not practically acceptable.

What is claimed is:

1. An apparatus for producing a liquid crystal panel, comprising:

a liquid crystal panel having an injection port;

a liquid crystal reservoir containing a liquid crystal; and a transfer member for transferring at least a portion of the liquid crystal contained in the liquid crystal reservoir to the injection port of the liquid crystal panel, said apparatus further comprising means for controlling the temperature $T_1$ of the liquid crystal within the liquid crystal reservoir, the temperature $T_2$ of the transfer member and the temperature $T_3$ of the injection port so as to satisfy a relationship of $T_1>T_3>T_2$, wherein $T_2$ is below the isotropic temperature of the liquid crystal.

2. An apparatus according to claim 1, further comprising means for controlling the temperature of the transfer member.

3. An apparatus according to claim 1, further comprising means for controlling the temperature of the injection port.

4. An apparatus according to claim 1, further comprising means for controlling the liquid crystal within the liquid crystal reservoir.

5. An apparatus according to claim 1, wherein the temperatures are controlled to satisfy a relationship of $T_1>T_3>T_4>T_2$ wherein $T_4$ denotes a temperature providing a higher temperature phase than a chiral smectic phase of the liquid crystal.

6. An apparatus according to claim 1, wherein the liquid crystal panel is formed to have a face having a length $L_1$ and including the injection port having a length $L_3$, and the transfer member is formed to have a face for applying the liquid crystal having a length $L_2$ satisfying a relationship of: $L_3 < L_2 < L_1$.

7. An apparatus according to claim 1, wherein the transfer member has a concave part for carrying the liquid crystal.

8. An apparatus for producing a liquid crystal panel, comprising:

a vacuum chamber;

a liquid crystal panel having an injection port; and a liquid crystal reservoir containing a liquid crystal, said liquid crystal panel and liquid crystal reservoir being disposed within the vacuum chamber, said apparatus further comprising a transfer member movable between the liquid crystal reservoir and the liquid crystal panel to transfer at least a portion of said liquid crystal from the liquid crystal reservoir to the injection port, wherein said portion of the liquid crystal is transferred to the injection port and then the vacuum chamber is restored to atmospheric pressure.

9. An apparatus according to claim 8, wherein the liquid crystal panel is formed to have a face having a length $L_1$ and including the injection port having a length $L_3$, and the transfer member is formed to have a face for applying the liquid crystal having a length $L_2$ satisfying a relationship of: $L_3 \leq L_2 \leq L_1$.

10. A process according to claim 8, wherein the transfer member has a concave part for carrying the liquid crystal.

11. An apparatus according to claim 1, wherein said liquid crystal has a phase transition series of crystal $\leftrightarrows$ chiral smectic phase $\leftrightarrows$ smectic A phase $\leftrightarrows$ isotropic phase.

12. An apparatus according to claim 9, wherein said liquid crystal has a phase transition series of crystal $\leftrightarrows$ chiral smectic phase $\leftrightarrows$ smectic A phase $\leftrightarrows$ isotropic phase.

* * * * *

UNITED STATES PATENT AND TRADEMARK OFFICE
CERTIFICATE OF CORRECTION

PATENT NO. : 5,564,479

DATED : October 15, 1996

INVENTOR : SATOSHI YOSHIHARA

Page 1 of 3

It is certified that error appears in the above-identified patent and that said Letters Patent is hereby corrected as shown below:

[56] REFERENCES CITED, UNDER U.S. PATENT DOCUMENTS

"4,753,267 6/1988 Inaba et al." should read --4,753,276 6/1988 Inaba et al.--.

COLUMN 3

Line 58, "CrystalSmC*SmACh.Iso.," should read --Crystal ⇌ SmC* ⇌ SmA ⇌ Ch. ⇌ Iso.,--.

Line 60, "CrystalSmC*Ch.Iso.," should read --Crystal ⇌ SmC* ⇌ Ch. ⇌ Iso., --.

Line 65, "CrystalSmC*SmAIso." should read --Crystal ⇌ SmC* ⇌ SmA ⇌ Iso.-- and "CrystalSm3SmC*Iso." should read --Crystal ⇌ Sm3 ⇌ SmC* ⇌ Iso.--.

UNITED STATES PATENT AND TRADEMARK OFFICE
CERTIFICATE OF CORRECTION

PATENT NO. : 5,564,479

DATED : October 15, 1996

INVENTOR(S): SATOSHI YOSHIHARA

It is certified that error appears in the above-identified patent and that said Letters Patent is hereby corrected as shown below:

<u>COLUMN 4</u>

Line 2, "satisfy" should read --satisfy $T_4$--.

Line 3, "$T_4$" should be deleted.

<u>COLUMN 5</u>

Line 30, "16'" should read --16"--.

<u>COLUMN 7</u>

Line 2, "$L_3<L_2<L_1$." should read --$L_3 \leq L_2 \leq L_1$.--.

UNITED STATES PATENT AND TRADEMARK OFFICE
CERTIFICATE OF CORRECTION

PATENT NO. : 5,564,479

DATED : October 15, 1996

INVENTOR(S) : SATOSHI YOSHIHARA

It is certified that error appears in the above-identified patent and that said Letters Patent is hereby corrected as shown below:

<u>COLUMN 8</u>

Line 15, "$L_3$" should read --$L_2$--.

Signed and Sealed this

Eighth Day of April, 1997

*Attest:*

BRUCE LEHMAN

*Attesting Officer*     *Commissioner of Patents and Trademarks*